United States Patent
LeBreton, IV et al.

(10) Patent No.: US 8,821,263 B1
(45) Date of Patent: Sep. 2, 2014

(54) LEVERAGING OPTIONAL GAME FEATURES TO REMOVE IN-GAME ASSETS FROM A VIRTUAL ECONOMY

(71) Applicant: Zynga Inc., San Francisco, CA (US)

(72) Inventors: Edward LeBreton, IV, San Francisco, CA (US); Michael Kane, San Francisco, CA (US); Justin Wickett, Tiburon, CA (US); Jessup Ferris, San Mateo, CA (US); Karl Boghossian, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 91 days.

(21) Appl. No.: 13/725,277

(22) Filed: Dec. 21, 2012

Related U.S. Application Data

(60) Provisional application No. 61/582,253, filed on Dec. 31, 2011.

(51) Int. Cl.
*G06F 17/00* (2006.01)
*A63F 13/00* (2014.01)

(52) U.S. Cl.
CPC ............ *A63F 13/005* (2013.01); *A63F 13/00* (2013.01)
USPC ................... 463/25; 463/29; 463/13

(58) Field of Classification Search
CPC .................. G07F 17/3244; G07F 17/3262
USPC ................... 462/25; 463/25, 29, 13
See application file for complete search history.

(56) References Cited

U.S. PATENT DOCUMENTS

| | | | | |
|---|---|---|---|---|
| 8,517,826 | B1* | 8/2013 | Hafezi | 463/25 |
| 8,721,417 | B2* | 5/2014 | Halverson | 463/13 |
| 2006/0058087 | A1* | 3/2006 | White et al. | 463/11 |
| 2012/0034962 | A1* | 2/2012 | Amaitis | 463/13 |

\* cited by examiner

*Primary Examiner* — Dmitry Suhol
*Assistant Examiner* — Carl V Larsen
(74) *Attorney, Agent, or Firm* — Schwegman Lundberg & Woessner, P.A.

(57) ABSTRACT

A method of removing virtual currency from a virtual economy associated with a game is disclosed. A notification is received. The notification indicates that a player of the game has accepted an offer to enable an optional feature of the game in exchange for having a rake performed on winnings of the player. The feature of the game is enabled. It is detected that the player has received the winnings. The rake is deducted from the winnings. The rake is removed from the virtual economy. The player is provided with the remaining winnings.

17 Claims, 19 Drawing Sheets

1100

US 8,821,263 B1

LEVERAGING OPTIONAL GAME FEATURES TO REMOVE IN-GAME ASSETS FROM A VIRTUAL ECONOMY

CROSS-REFERENCE TO RELATED APPLICATIONS

This application claims the benefit of U.S. Provisional Application No. 61/582,253, filed Dec. 31, 2011, entitled "LEVERAGING OPTIONAL GAME FEATURES TO REMOVE IN-GAME ASSETS FROM A VIRTUAL ECONOMY," which is incorporated herein by reference in its entirety.

TECHNICAL FIELD

This application relates generally to the technical field of managing virtual economies, in one specific example, raking winnings of a player of a game based on a player opting in to activate optional features of the game.

BACKGROUND

A virtual economy exists in some virtual worlds. For example, in a virtual world, a user (e.g., via a player character) may be able to earn virtual currency and then use the virtual currency to purchase virtual items. Or, a user may be able to play a gambling game in the virtual world (e.g., blackjack, poker, slots, and so on) in which the user risks losing virtual currency in exchange for winning additional virtual currency. Depending on various factors, such as the rate at which users are able to earn or win virtual currency or the rate at which user spend their virtual currency, the virtual economy of the virtual world may become unbalanced (e.g., because of inflation).

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In various embodiments, methods and systems for removing virtual currency from a virtual economy associated with a game is disclosed. A notification is received. The notification indicates that a player of the game has accepted an offer to enable an optional feature of the game in exchange for having a rake performed on winnings of the player. The feature of the game is enabled. It is detected that the player has received the winnings. The rake is deducted from the winnings. The rake is removed from the virtual economy. The player is provided with the remaining winnings.

Figure 1:
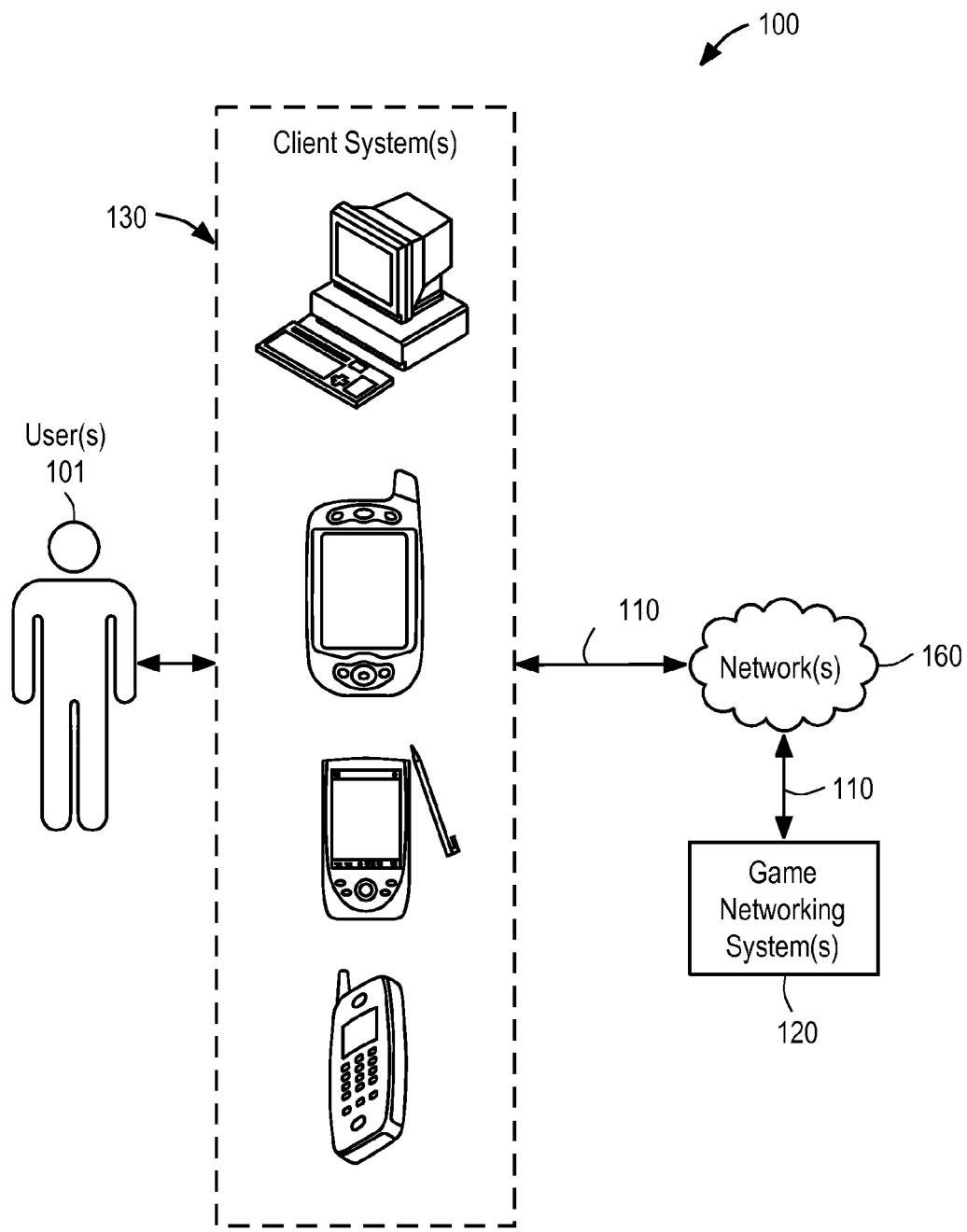
FIG. 1 is a block diagram illustrating an example of a game networking system for implementing various disclosed embodiments.

FIG. 1 is a block diagram illustrating an example of a system 100 for implementing various disclosed embodiments. In particular embodiments, system 100 comprises user(s) 101, game networking system 120, client system 130, and network 160. The one or more users(s) 101 may also be referred to as one or more player(s); and the player(s) may also be referred to as the user(s) 101. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Game networking system 120 is a network-addressable computing system that can host one or more online games. Game networking system 120 can generate, store, receive, and transmit game-related data, such as, for example, game account data, game input, game state data, and game displays. Game networking system 120 can be accessed by the other components of system 100 either directly or via network 160. Player 101 may use client system 130 to access, send data to, and receive data from game networking system 120. Client system 130 can access game networking system 120 directly, via network 160, or via a third-party system. Client system 130 can be any suitable computing device, such as a personal computer, laptop, cellular phone, smart phone, computing tablet, and the like.

Although FIG. 1 illustrates a particular number of players 101, game networking systems 120, client systems 130, and networks 160, this disclosure contemplates any suitable number of players 101, game networking systems 120, client systems 130, and networks 160. Although FIG. 1 illustrates a particular arrangement of player 101, game networking system 120, client system 130, and network 160, this disclosure contemplates any suitable arrangement of player 101, game networking system 120, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, game networking system 120, client system 130, and network 160, this disclosure contemplates any suitable connections between player 101, game networking system 120, client system 130, and network 160. As an example and not by way of limitation, in particular embodiments, client system 130 may have a direct connection to game networking system 120, thereby bypassing network 160.

Online Games and Game Systems
Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including NPCs and in-game objects. The game engine also manages game state, including player character state for currently active (e.g., online) and inactive (e.g., offline) players.

An online game can be hosted by game networking system 120, which can be accessed using any suitable connection with a suitable client system 130. A player may have a game account on game networking system 120, wherein the game account can contain a variety of information associated with the player (e.g., the player's personal information, financial information, purchase history, player character state, game state, etc.). In some embodiments, a player may play multiple games on game networking system 120, which may maintain a single game account for the player with respect to all the games, or multiple individual game accounts for each game with respect to the player. In some embodiments, game networking system 120 can assign a unique identifier to each player 101 of an online game hosted on game networking system 120. Game networking system 120 can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, or game networking system 120). As an example and not by way of limitation, client system 130 can download client components of an online game, which are executed locally, while a remote game server, such as game networking system 120, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, game networking system 120). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120, which is managed by the game operator. In other embodiments, the social graph is part of a social networking system managed by a third-party (e.g., Facebook, Friendster, Myspace). In yet other embodiments, player 101 has a social network on both game networking system 120 and social networking system, wherein player 101 can have a social network on the game networking system 120 that is a subset, superset, or independent of the player's social network on social networking system. In such combined systems, game network system 120 can maintain social graph information with edge type attributes that indicate whether a given friend is an "in-game friend," an "out-of-game friend," or both. The various embodiments disclosed herein are operable when the social graph is managed by the social networking system, game networking system 120, or both.

Figure 2:
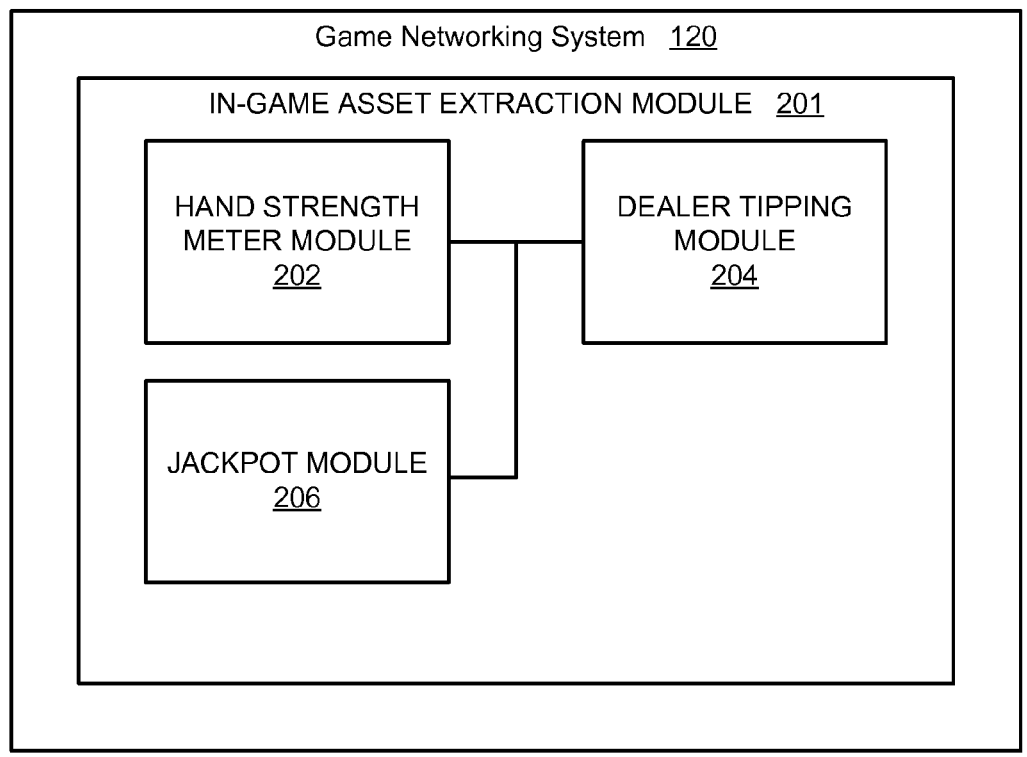
FIG. 2 is a block diagram illustrating an example in-game asset extraction module of the game networking system that is configured to leverage optional features of the game networking system to remove virtual currency from a virtual economy associated with the game networking system.

FIG. 2 is a block diagram illustrating an example in-game asset extraction module 201 of the game networking system 120 that is configured to leverage optional features of the game networking system 120 to remove virtual currency from a virtual economy associated with the game networking system 120.

In various embodiments, the game networking system may implement sales of in-game assets to players of one or more computer-implemented games of the game networking system 120. For example, the game networking system 120 may implement one or more modules that enable players of a poker game (e.g., Zynga Poker) executing on the game networking system 120 to purchase poker chips for the poker game.

When a player purchases an in-game asset (e.g., virtual currency), the game networking system 120 may add the in-game asset purchased by the player to a pool of in-game assets in a virtual economy associated with the game networking system 120. In various circumstances, an owner or administrator of the game networking system 120 may wish to reduce the in-game assets in the virtual economy. For example, in order to increase revenues derived from sales of in-game assets, the owner of the game networking system 120 may wish to encourage players of the game to use, consume, spend, or otherwise get rid of their in-game assets more quickly. In other words, the game networking system 120 may determine that if players use up their in-game assets more quickly, they may be more likely to purchase additional in-game assets sooner. Or if the owner of the game networking system 120 offers in-game assets for sale at temporarily reduced prices, which results in a flood of in-game assets coming into the virtual economy, the owner of the game networking system 120 may wish to reduce the in-game assets in the virtual economy to, for example, restore a balance in the virtual economy that existed before the temporary sale of the in-game assets at the reduced rates.

Various modules associated with the game networking system 120 may implement various optional features that may be enables or disables with respect to one or more games. Such features may add to the enjoyment of players in playing a game, but may not be required for the players to play the game. For example, a Hand Strength Meter module associated with a card game (e.g., a poker game) may be configured to provide players with information concerning the strength of a given hand in a given situation. The strength of a hand may be defined as the probability that a particular hand at a particular point in a round of the card game will win the round of the card game. For example, the strength of a hand after the hole cards are dealt in a Texas Hold 'Em game may be the probability that the particular two hole cards dealt to a player will ultimately win that round of the game.

Or a Tipping module associated with a card game may enable the player to tip the virtual dealer of a card game with virtual currency, thus simulating the way the player would tip a real dealer at a card game in the real world with real money. The game networking system 120 may add these modules to one or more games of the game networking system 120 based on one or more factors, including a determination that virtual currency should be removed from a virtual economy associated with the one or more games or from a virtual economy associated more generally with the game networking system itself. The modules are described in more detail below.

The game networking system 120 may offer one or more optional (e.g., modularized) features of a game to a player for a fee. This fee may be a real money fee or an in-game asset fee. For example, the game networking system may provide an offer to a player to enable the Hand Strength Meter for a card game for a specific amount of time if the player agrees to pay a specific amount of virtual currency (e.g., chips). In accepting this offer, the player may effectively use his virtual currency to enhance his enjoyment of the game or to receive information that may improve his chances of winning the game or a portion of the game (e.g., a hand of a poker game).

In various embodiments, the game networking system 120 may offer to enable the one or more optional features of the game to the player in exchange for the player agreeing to have winnings or bankrolls of in-game assets associated with his use of the feature being raked (e.g., by a certain percentage of the winnings or another predetermined amount). In accepting this offer, the player may not pay any fee if he does not win additional in-game assets associated with his use of the optional feature. For example, the game networking system 120 may offer the player an option to use the Hand Strength Meter for a particular hand of a poker game in exchange for having any of the player's winnings from the hand raked by 5%. Thus, in this case, if the player wins a pot of 1,000 chips, the game networking system may rake 50 chips from the winnings, awarding the player 9,550 chips and removing 50 chips from the virtual economy. However, if the player loses the hand, the game networking system may not charge the player a fee for using the Hand Strength Meter during the hand. After receiving the player's acceptance of the offer to have winnings raked, the game networking system may implement the rake without additional notifications to the player each time the rake is performed. Alternatively, the game networking system 120 may notify the player when a rake is performed (e.g., via a user interface element).

In various embodiments, the game networking system 120 may enable the player to enable a feature of the game on an ongoing basis in exchange for the player opting in to having a rake applied to all or a certain percentage of future in-game assets won by the player. Thus, the game networking system 120 may apply a rake to 0.5% of pots won, 10% of pots won, 50% of pots won, and so on. The game networking system 120 may select a percentage of winnings to which to apply the rake based on an analysis of adoption rates by players at different percentages (e.g., supply and demand).

In various embodiments, for a card game having blinds, the amount of the rake may be limited to amount equal to one big blind. In various embodiments, the rake may be removed from the bankroll chips of the player such that the number of chips in play at the table are not affected by the player's decision to opt-in to enabling the feature. In various embodiments, the feature will be disabled if the player does not have enough virtual currency to cover the maximum amount of rake that could be applied to the player's winnings during a stage of the game.

The in-game asset extraction module 201 includes a Hand Strength Meter module 202. The Hand Strength meter module 202 is configured to keep track of which players have enabled the Hand Strength Meter feature, when players have won a pot, how big relevant pots are, the amount of rake to be charged to a winning player, and so on. Additionally, the Hand Strength Meter module 202 may implement the rake to remove in-game assets from the virtual economy of a card game.

The Hand Strength Meter module 202 may enable the Hand Strength Meter feature for free for a particular number of hands or until a player reaches a particular experience level within a game (e.g., through accumulation of experience points). Thus, the Hand Strength Meter module 202 may effectively market the Hand Strength Meter feature to players, enabling the players to experience the benefits of the feature before requiring players to pay a fee to use the feature.

The Hand Strength meter module 202 may customize the rake that is charged based on various factors, such as the total value of the player's in-game assets, the player's experience within a game, or various other attributes of the player that are tracked by the game networking system 120. For example, the rake percentage for a using a feature may be higher based on the player owning in-game assets having a high value relative to in-game assets owned other players.

The Hand Strength Meter module 202 may determine a strength of a hand based on various factors such as a rank of the hand, a stage of the hand (e.g., how many cards have been dealt, such as hole cards, the flop, the turn, or the river in Texas Hold 'Em), a number of outs a player has to make a hand having a higher rank, the strength of the hand relative to possible draws (e.g., straight draws or flush draws), table positions of the players, potential opponent hands (e.g., expected value), and so on. The Hand Strength Meter module 202 may calculate all possible hole cards for a player's opponent and determine the strength of the player's hand accordingly. For example, if the majority of the opponent's possible hole cards give the opponent a better chance of winning the hand than the player, the Hand Strength Meter module 202 may determine that the strength of the player's hand is less than 50%.

The Hand Strength Meter module 202 may perform various degrees of calculations of a player's hand strength based on various factors, such as the player's specified preference or a fee paid by the player. For example, the Hand Strength Meter module 202 may require the player to pay a larger rake for a full evaluation than for a minimal evaluation. The full evaluation may include comparing the player's hands to possible hands of the player's opponent. The minimal evaluation may include merely checking for chances of improving the hand based on draws (e.g., number of outs to a straight or flush) without considering the expected value of the opponent's hand.

The Hand Strength Meter module 202 may calculate pot odds in conjunction with or in addition to determining the strength of a hand. The pot odds may be represented as a percentage that compares the cost of seeing the next card (calling an opponent's bet) to the pot value. The pot odds may be helpful to the player in gauging his probability of winning relative to the likely payout. For example, if you think your probability of winning is roughly 50% and the pot odds are only 30%, the player may wish to call a bet or raise to see the next card.

The Hand Strength Meter module 202 may calculate the pot odds as follows. Pot odds are $1/(ratio+1)$ where 'ratio' is the variable in a odds ratio set to one; i.e. X:x1. For example, if the pot is $100 and it is $50 to call, the ratio is 2:1 and the pot odds are $1/(2+1)=1/3=33\%$. This makes sense if you consider that, given this situation 3 times in a row, you only need to win 1 of the 3 times to break even: $-50-50+100=0$.

The Hand Strength Meter module 202 may communicate with a front-end module (not shown) executing on a client system 130 (e.g., a Flash layer and/or PHP player that the player loads within a Facebook canvas). The front-end module may handle the display of the feature (e.g., the Hand Strength Meter), communication to the player concerning the fee to be charged to the player for using the feature, and so on. Various example embodiments of user interfaces of the Hand Strength Meter feature are described below.

The Dealer Tipping module 204 is configured to enable the player to tip a virtual dealer of a card game (e.g., with virtual currency). Like the Hand Strength Meter module 202, Dealer Tipping module 204 may enable the player to access the functionality of the Dealer Tipping module without paying a fee for a limited duration (e.g., until the player transgresses a threshold with respect to the game (e.g., an experience level or a number of hands played)). To enable the functionality of the Dealer Tipping module 204 going forward, the Dealer Tipping module 204 may require the player to opt-in to paying a fee. Like the Hand Strength meter module 202, The Dealer Tipping module 204 may collect the fee as a rake that is applied to hands won by the player. The rake collected by the Dealer Tipping module 204 may be in addition to a rake collected by one or more additional modules (e.g., the Hand Strength Meter module 202 or the Jackpot module 206).

The Jackpot Module 206 is configured to enable the player to participate in jackpots (e.g., progressive jackpots that are paid out when certain conditions are met, such as when a player at the table shows a Royal Flush). Like the modules 202 and 204, The Jackpot module 206 may collect the fee as a rake that is applied to hands won by the player. The rake collected by the Jackpot module 204 may be in addition to a rake collected by one or more additional modules (e.g., the Hand Strength Meter module 202 or the Dealer Tipping module 204).

Figure 3:
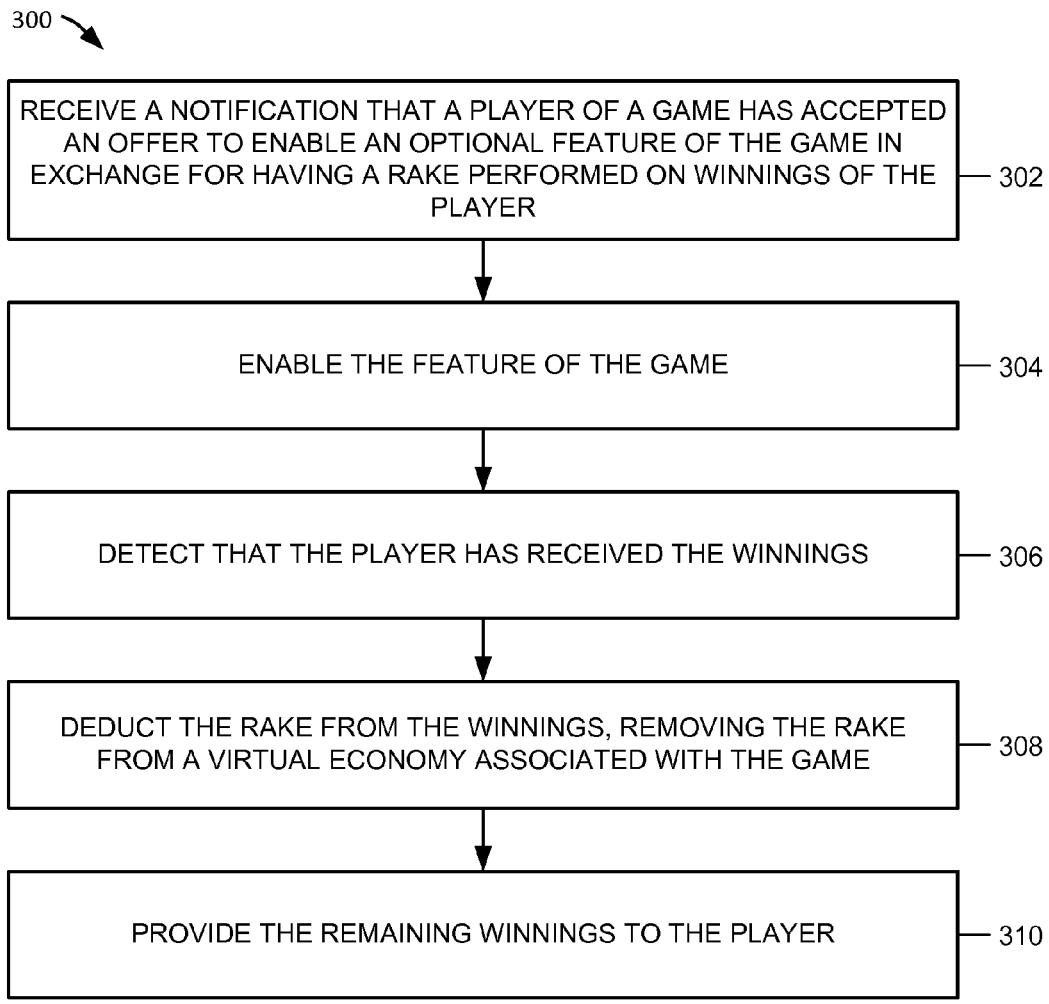
FIG. 3 is a flow chart illustrating an example embodiment of a method 300 of providing a feature of a game to a player in exchange for the player opting-in to having the game networking system rake in-game assets won by the player.

FIG. 3 is a flow chart of an example embodiment of a method 300 of providing a feature of a game to a player in exchange for the player opting-in to having the game networking system 120 rake in-game assets won by the player. In various embodiments, the method 300 is implemented by the in-game extraction module 201. At operation 302, the in-game asset extraction module 201 receives a notification that a player of a game has accepted an offer to enable an optional feature of the game in exchange for having a rake performed on winnings of the player. At operation 304, the in-game asset extraction module 201 enables the feature of the game. At operation 306, the in-game asset extraction module 201 detects that the player has received the winnings. At operation 308, the in-game asset extraction module 201 deducts the rake from the winnings, removing the rake from a virtual economy associated with the game. At operation 310, the in-game asset extraction module 201 provides the remaining winnings to the player.

Figure 4:
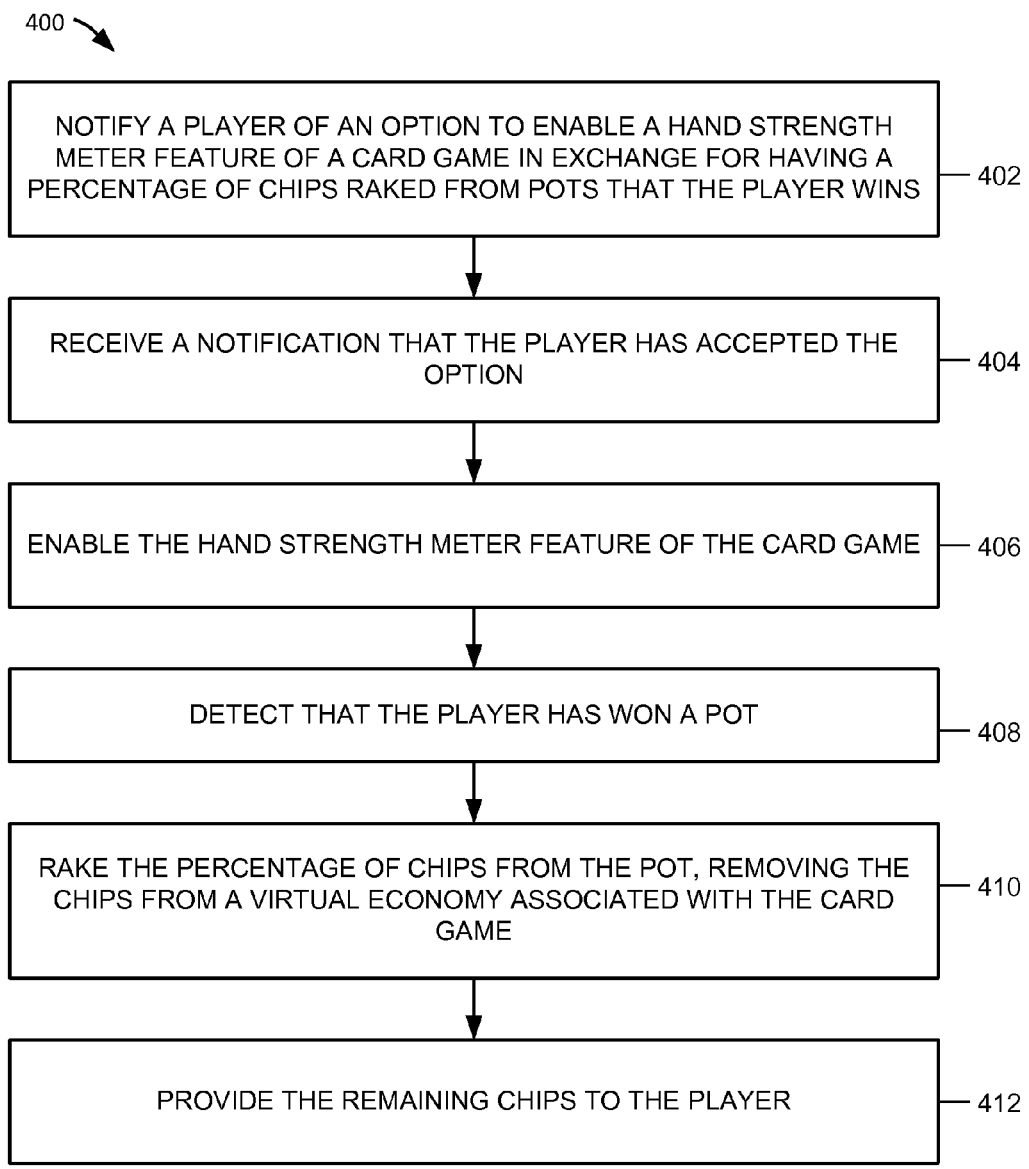
FIG. 4 is a flow chart illustrating an example embodiment of a method 400 of enabling a hand strength meter for a card game based on a player opting in to having chips raked from pots that the player wins.

FIG. 4 is a flow chart of an example embodiment of a method 400 of enabling a hand strength meter for a card game based on a player opting in to having chips raked from pots that the player wins. In various embodiments, the method 400 is implemented by the Hand Strength Meter module 202. At operation 402, the Hand Strength Meter module 202 notifies a player of an option to enable a hand strength meter feature of a card game in exchange for having a percentage of chips raked from pots that the player wins. At operation 404, the Hand Strength Meter module 202 receives a notification that the player has accepted the option. At operation 406, the Hand Strength Meter module 202 enables the hand strength meter of the card game. At operation 408, the Hand Strength Meter module 202 detects that the player has won a pot. At operation 410, the Hand Strength meter module 202 rakes the percentage of chips from the pot, removing the chips from a virtual economy associated with the card game. At operation 412, the Hand Strength meter 202 provides the remaining chips to the player.

Figure 5A:
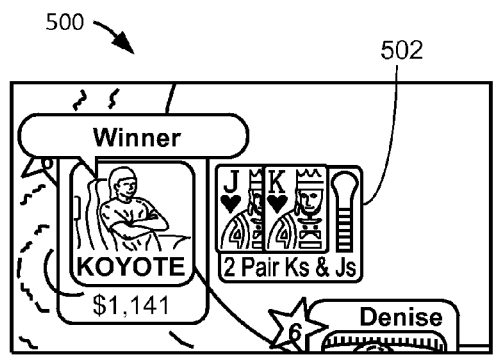
FIG. 5A-5D are screenshots depicting example embodiments of user interfaces for the Hand Strength Meter feature.

FIG. 5A is a screenshot of an example embodiment of a user interface 500 for the Hand Strength Meter feature. In various embodiments, the user interface 500 is communicated to a front-end client application from the Hand Strength Meter module 202 for displaying to a user. In various embodiments, the Hand Strength Meter 502 is a small tool that persistently appears beneath and beside the player's cards. It may include a hand name as well as a hand strength measure. For example, the Hand Strength Meter 502 specifies that the name of the hand is "2 Pair Ks & Js." Furthermore, the Hand Strength Meter 502 specifies the strength of the hand with hand strength measure having a bulb-shaped meter. The closer the bulb is to being totally filled, the closer the hand is to being the strongest possible hand. In various embodiments, the Hand Strength module 202 calculates the strength of the hand based on a combination of the current strength of the hand (e.g., as a percentage) and the pot odds (e.g., as a percentage) that the player will make a stronger hand before the end of a round of the game. For example, in a Texas Hold 'Em game, the Hand Strength module 202 may calculate the strength of the hand after the flop is dealt based at least partially on the chances that the player will make a stronger hand before the river card is dealt. Furthermore, the Hand Strength module 202 may calculate the strength of the hand at least partially on the odds that the player will make a stronger hand in comparison to the size of the pot (e.g., if the pot is large, the Hand Strength module 202 may calculate a higher strength of a hand that is a drawing hand in comparison to a hand that is a made hand).

Figure 5B:
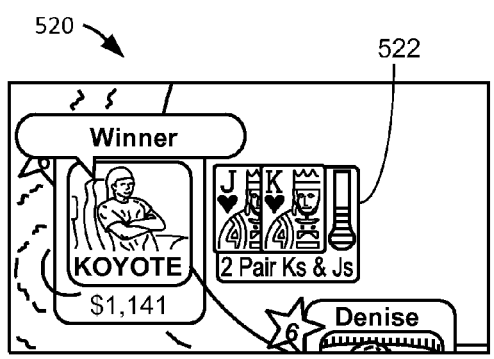

FIG. 5B is a screenshot of an example embodiment of a user interface 520 for the Hand Strength Meter feature. In various embodiments, the user interface 520 is communicated to a front-end client application from the Hand Strength Meter module 202 for displaying to a user. Here, the Hand Strength Meter 522 is depicted as having hand strength measure with a bulb shape at the bottom.

Figure 5C:
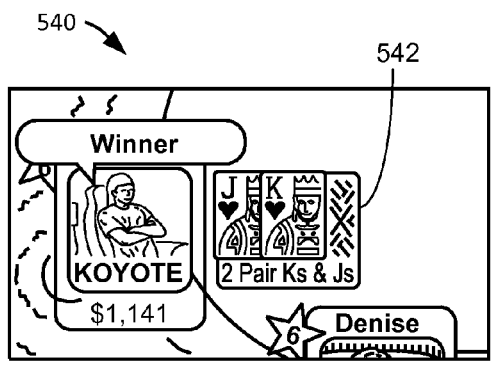

FIG. 5C is a screenshot of an example embodiment of a user interface 540 for the Hand Strength Meter feature. In various embodiments, the user interface 540 is communicated to a front-end client application from the Hand Strength Meter module 202 for displaying to a user. Here, the Hand Strength Meter 542 is depicted as having a hand strength measure that is a pile of poker chips. (The closer the pile is to the top of the hand strength measure, the stronger the hand is.)

Figure 5D:
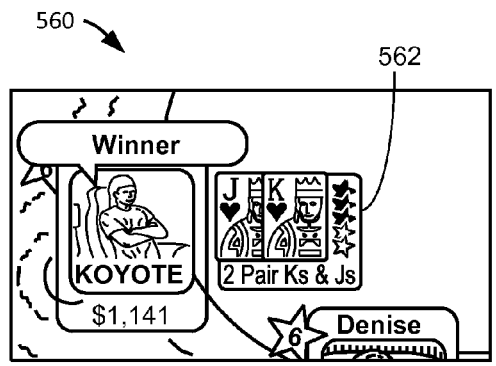

FIG. 5D is a screenshot of an example embodiment of a user interface 560 for the Hand Strength Meter feature. In various embodiments, the user interface 560 is communicated to a front-end client application from the Hand Strength Meter module 202 for displaying to a user. Here, the Hand Strength Meter 562 is depicted as having a hand strength measure consisting of five stars. The more stars that are filled, the stronger the hand is.

Figure 6:
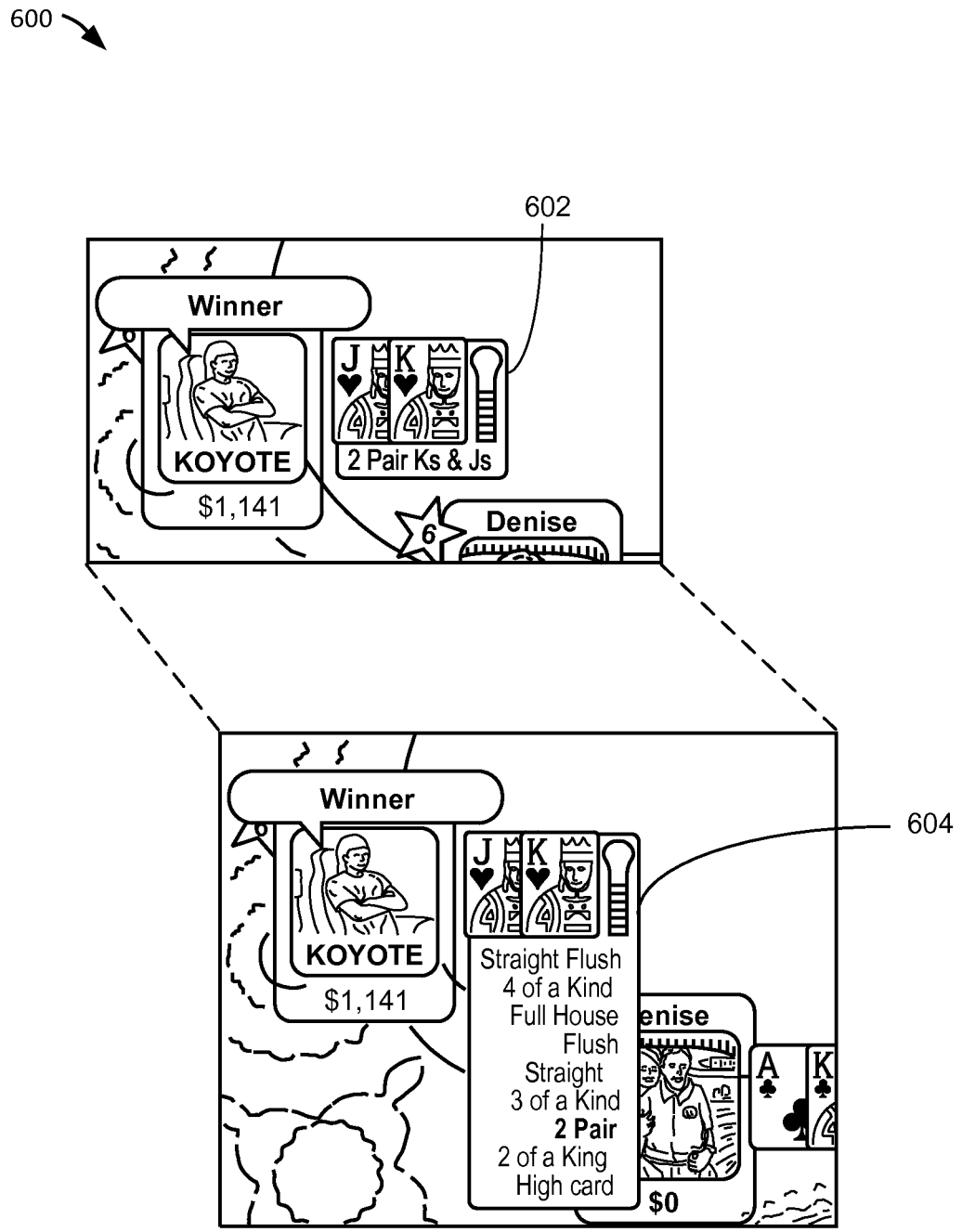
FIG. 6 includes screenshots depicting an example embodiment of a user interfaces for the Hand Strength Meter feature in which hand strength information is expandable.

FIG. 6 is a screen shot of example embodiments of a user interface 600 for the Hand Strength Meter feature in which hand strength information is expandable. In various embodiments, the user interfaces 600 are communicated to a front-end client application from the Hand Strength Meter module 202 for displaying to a user. In various embodiments, if the player mouses-over the hand name of the Hand Strength Meter 604, the hand strength name enters a highlight state—e.g., the tab pulls out a little and a glow encapsulates it. If the player clicks on the hand name, the box expands downward to show the full list of hands and shows where the current hand fits in relation to the others, as depicted by Hand Strength Meter 604. Depending on where the player is seated, this list may expand upward to cover the player's cards. The tab is close as soon as the player removes his mouse from within the hand name bounds.

Figure 7:
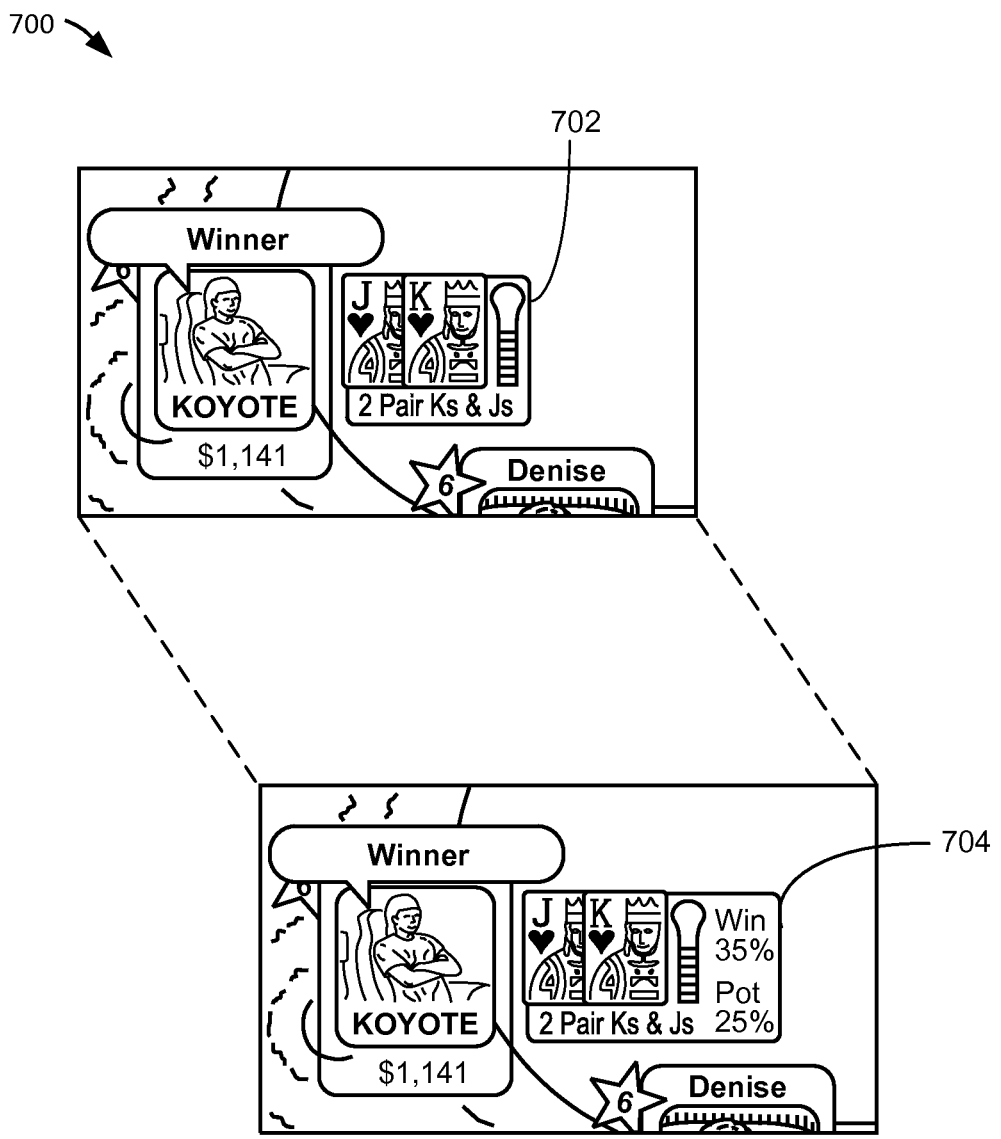
FIG. 7 includes screenshots depicting an example embodiment of a user interface for the Hand Strength Meter feature in which hand strength information has been further expanded.

FIG. 7 is a screenshot of an example embodiment of a user interface 700 for the Hand Strength Meter feature in which hand strength information is further expandable. In various embodiments, the user interface 700 is communicated to a front-end client application from the Hand Strength Meter module 202 for displaying to a user. If various embodiments, if the player mouses-over the hand strength measure of the Hand Strength Meter 702, the hand strength measure enters a highlight state—e.g., the tab pulls out a little and a glow encapsulates it. If the player clicks on the hand strength measure, the box expands outward to show additional information (e.g., a success percentage and a pot odds percentage), as depicted by hand Strength Meter 704. In various embodiments, the tab is closed if the player clicks on it again, another card is dealt, or the hand ends; otherwise, it remains in place.

Figure 8:
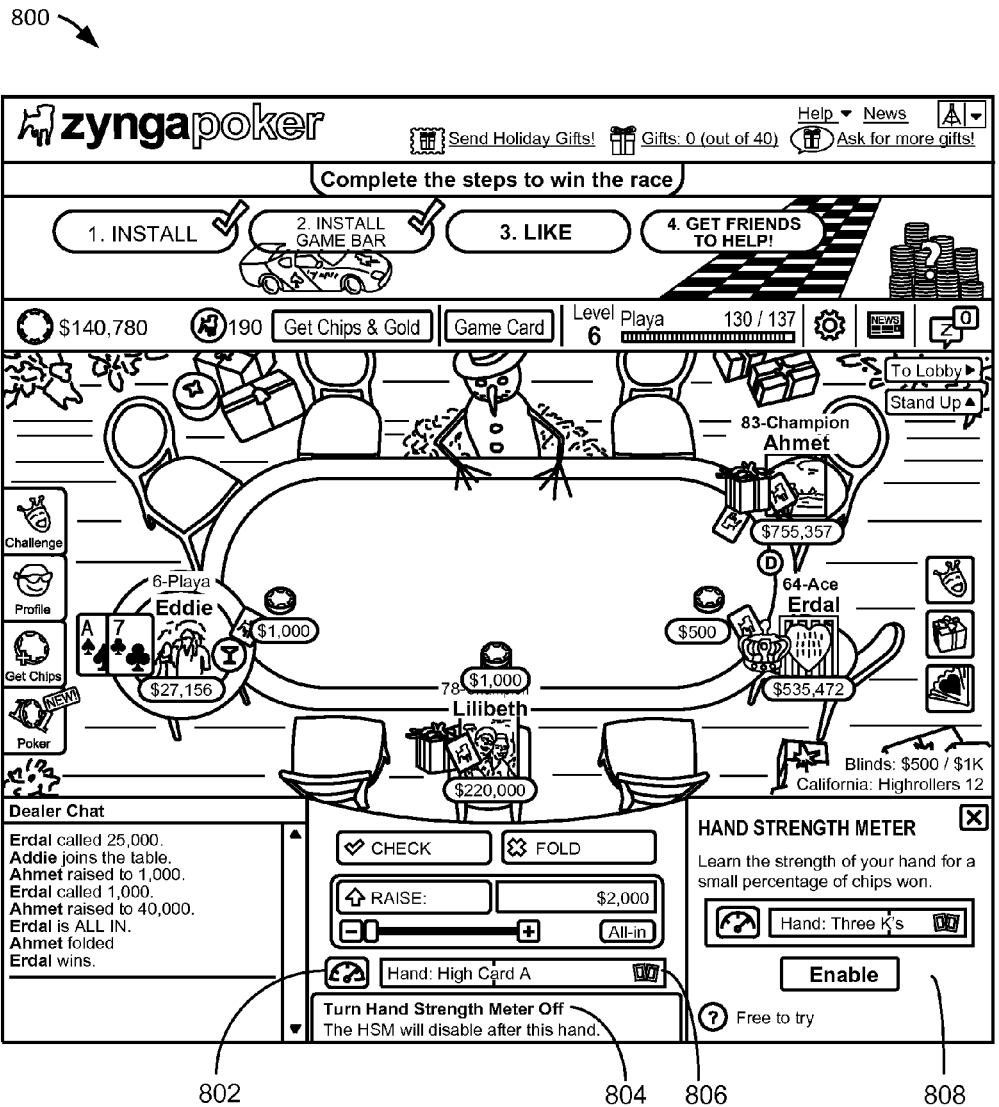
FIG. 8 is a screenshot depicting an example embodiment of a user interface in which a player of a poker game is notified of an option to enable the Hand Strength Meter feature of the game.

FIG. 8 is a screenshot of an example embodiment of user interface 800 in which a player of a poker game is notified of an option to enable the Hand Strength meter feature of the game. In various embodiments, the user interfaces 800 are communicated to a front-end client application from the Hand Strength Meter module 202 for displaying to a user. The user interface 800 includes a hand strength measure 802 and a hand name 806. In various embodiments, a display region of the hand name 806 doubles as a meter in that it is backfilled (e.g., with a blue color) to show the calculated strength of the hand. The user interface 800 also includes an indicator 804 of whether the Hand Strength Meter is on or off (or whether it will be turned on or off in the near future; e.g., after the current hand). The user interface 800 also includes a notification 808 of an option to enable the Hand Strength Meter. The notification may include a textual description of the Hand Strength Meter, a graphical representation of an example of the Hand Strength Meter, and a user interface element (e.g., a button) for activating the Hand Strength Meter.

Figure 9:
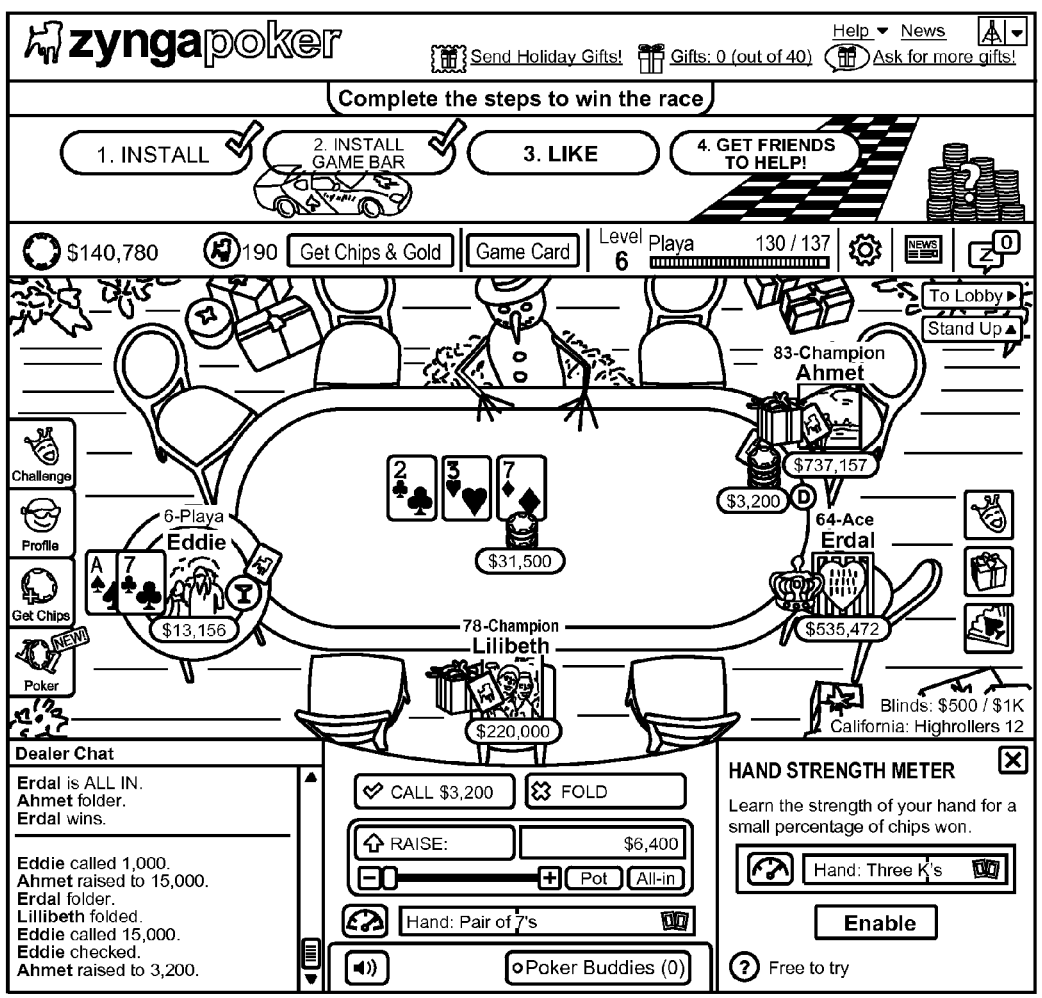
FIG. 9 is a screenshot depicting an example embodiment of a user interface in which the Hand Strength Meter has been updated based on a change to the state of the game.

FIG. 9 is a screenshot of an example embodiment of a user interface 900 in which the Hand Strength Meter changes based on the state of the game. In various embodiments, the user interfaces 900 are communicated to a front-end client application from the Hand Strength Meter module 202 for displaying to a user. Here, the user interface 900 depicts changes to the Hand Strength Meter based on the flop having been dealt in a continuation of the Texas Hold 'Em game depicted in FIG. 8. The player now has a pair of 7s, but the player's hand strength has decreased slightly since the before the flop was dealt.

Figure 10:
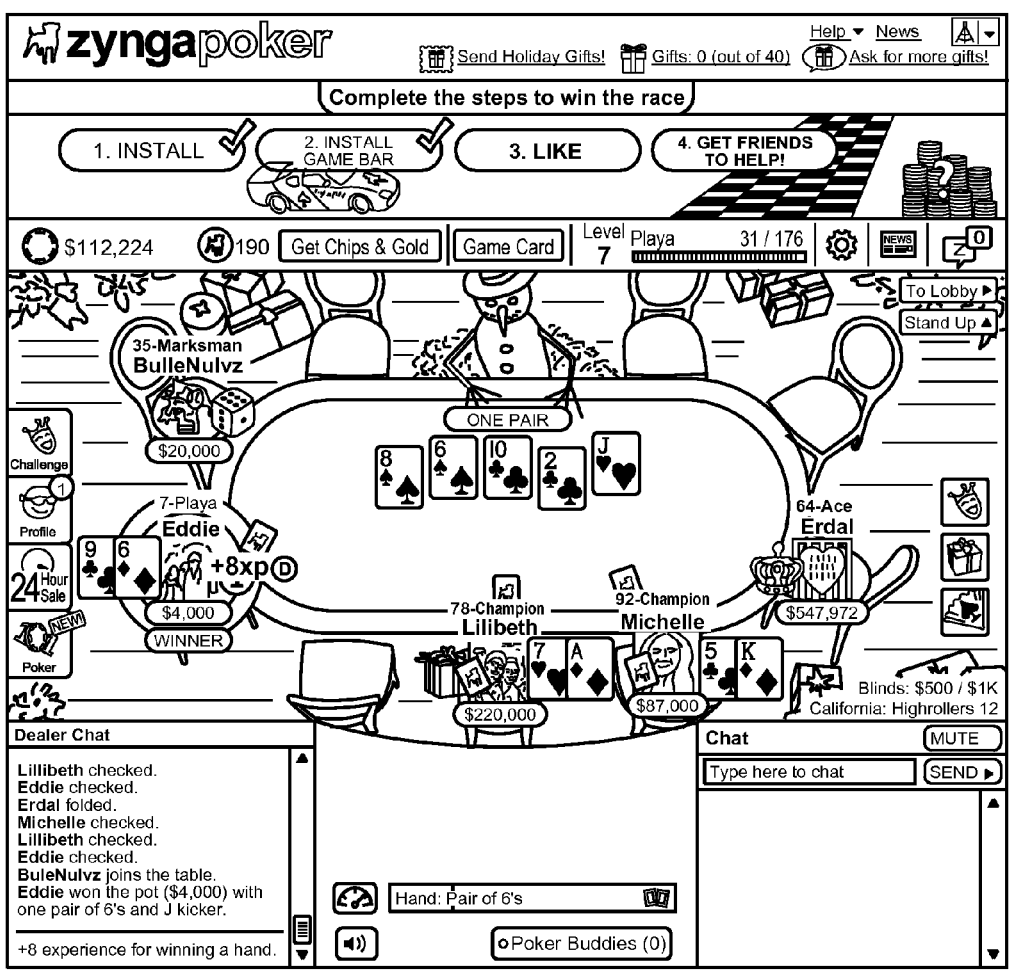
FIG. 10 is a screenshot depicting an example embodiment of a user interface in which the Hand Strength Meter feature of a game is made available to the player temporarily without the player enabling it.

FIG. 10 is a screenshot of an example embodiment of a user interface 1000 in the Hand Strength meter feature of the game is automatically enabled temporarily for free to the player without the player having opted in. In various embodiments, the user interfaces 1000 are communicated to a front-end client application from the Hand Strength Meter module 202 for displaying to a user.

Figure 11:
FIG. 11 includes screenshots depicting example embodiments of user interfaces associated with the Hand Strength meter feature of a card game.

FIG. 11 is a screenshot of an example embodiment of a user interface 1100 for the Hand Strength meter feature of a card game. In various embodiments, the user interface 1100 is communicated to a front-end client application from the Hand Strength Meter module 202 for displaying to a user. The user interface 100 depicts an embodiment of the Hand Strength Meter that does not consider the expected value of opponents' cards. However, various other embodiments take into consideration the expected value of opponents' cards, as described above. In various embodiments, there may be a goal to control inflation in the virtual economy associated with a game (e.g., from a 3× re-price), without implementing a "table rake." The solution is to charge pots won (i.e., rake) via an opt-in feature (e.g., the Hand Strength Meter). In various embodiments, the Hand Strength Meter is a visual indicator of hand effectiveness, based on the number of "outs" available that updates as new cards are revealed. In various embodiments, the calculation factors a user's cards and the community cards, but NOT their opponents' cards. Users are charged a percentage of pots won. If they lose, it's free.

Figure 12:
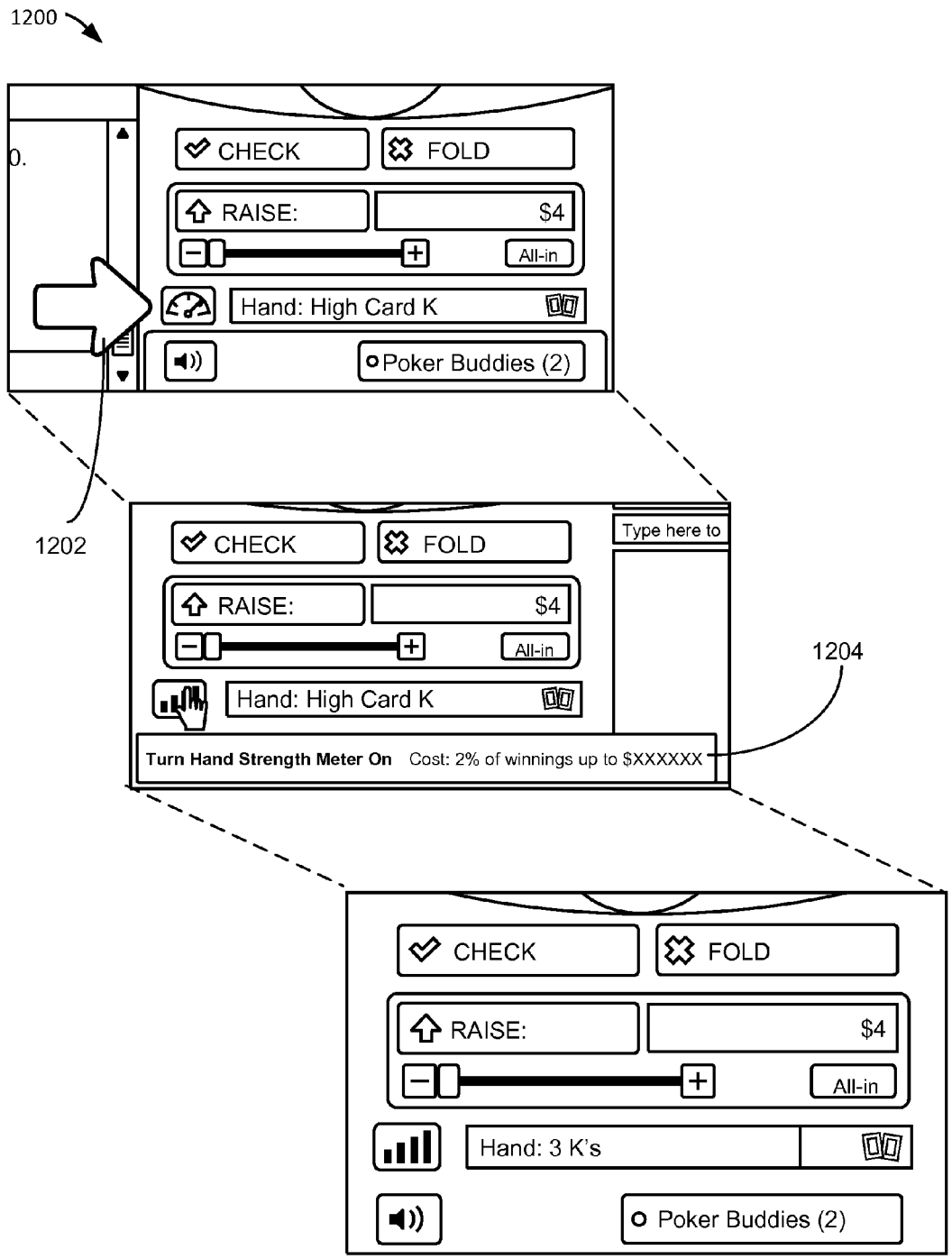
FIG. 12 includes screenshots depicting an example embodiment of a user interface presented when a player has not yet opted in to using the Hand Strength meter feature of a card game.

FIG. 12 is screenshot of user interface 1200 that illustrates a presentation flow for when a player has not yet opted in to using the Hand Strength meter feature of a card game. In various embodiments, the user interface 1200 is communicated to a front-end client application from the Hand Strength Meter module 202 for displaying to a user. Buttons at the bottom of the betting control area may be rearranged to allow for an on/off indicator for the Hand Strength Meter. When the Hand Strength meter is inactive, if various criteria are met (e.g., first entry into a table after progressing to XP 2 or above), show arrow 1202 for 3 seconds after the first marketing pop-up. Disable if player clicks on button. Hover on Icon or hand info displays "Turn HSM On" tooltip with half second delay. Clicking hand Strength Meter icon or hand info bar activates the On state.

Figure 13:
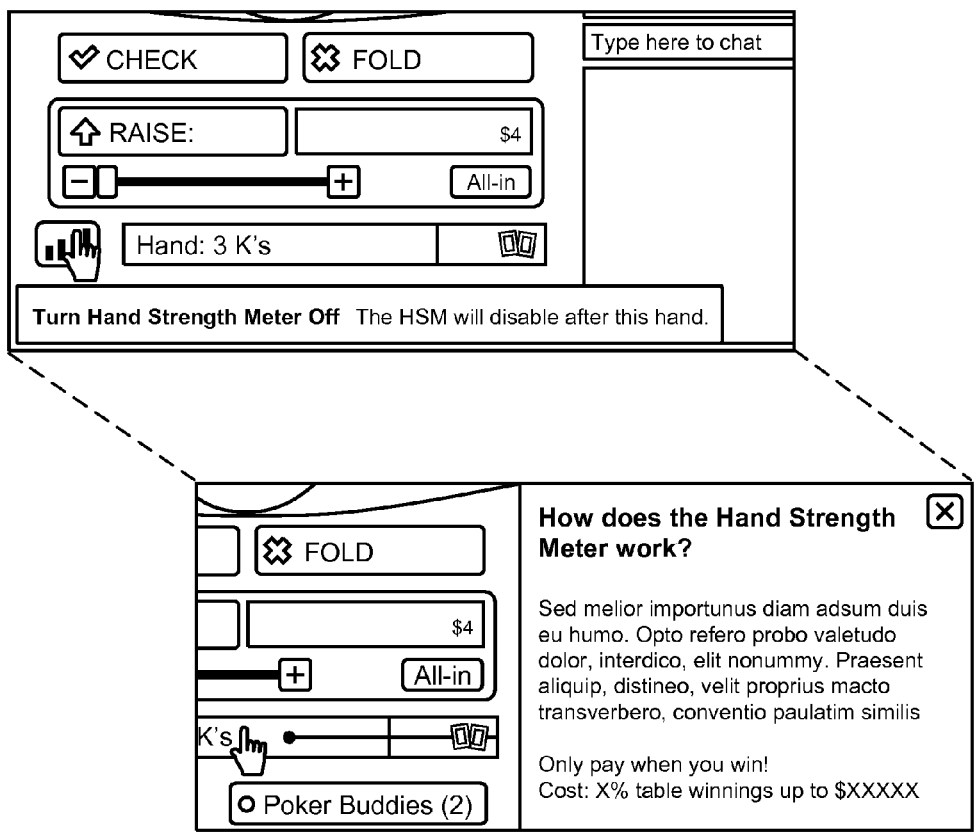
FIG. 13 includes screenshots depicting an example embodiment of a user interface presented when a player seeks more information about the Hand Strength meter feature of a card game.

FIG. 13 is a screenshot of an example embodiment of a user interface 1300 in a presentation flow for when a player has opted in to using the Hand Strength meter feature of a card game. In various embodiments, the user interface 1300 is communicated to a front-end client application from the Hand Strength Meter module 202 for displaying to a user. In various embodiments, when the Hand Strength Meter is active, the Hand Strength Meter shows the current strength of the user's hand (if the user is currently playing a hand). Hovering on the icon displays "Turn HSM Off" tooltip with half second delay. Clicking the bar itself triggers the "More info" pop-up. When the on/off button is clicked while the Hand Strength Meter is active, a small notification window may appear below the HSM that reads "The Hand Strength meter will turn off after this hand." The Hand Strength Meter may turn inactive at the completion of the current hand. At tournament tables, the Hand Strength Meter may be disabled (e.g., grayed out). Clicking or hovering on the Hand Strength Meter pops up a tooltip with a message like this "The Hand Strength meter is not available on tournament tables."

Figure 14A:
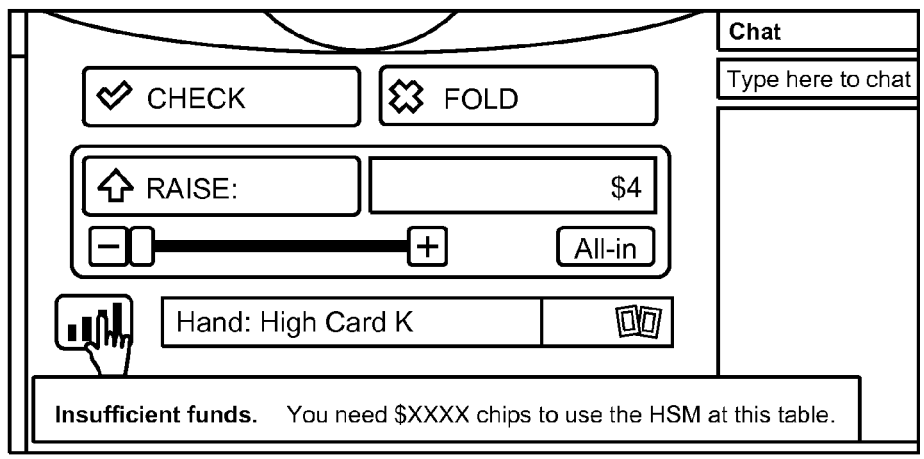
FIG. 14A-14B are screenshots depicting example embodiments of user interfaces of presenting an insufficient funds notification message to a player.

FIG. 14A is a screenshot of an example embodiment of a user interface 1400 of presenting an insufficient funds notification message to a player when the Hand Strength Meter is off. In various embodiments, the user interface 1400 is communicated to a front-end client application from the Hand Strength Meter module 202 for displaying to a user. In various embodiments, should the difference between the user's total chip stack and chips at the table fall below the maximum rake, the Hand Strength Meter may not turn on or deactivate if currently in a hand. If the player tries to turn on the Hand Strength meter but has insufficient funds, display the tooltip on click of the icon.

Figure 14B:
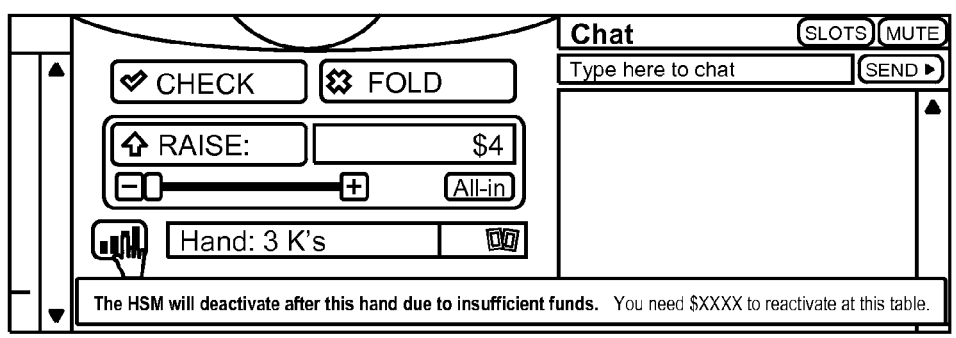

FIG. 14B is a screenshot of an example embodiment of a user interface 1450 of presenting an insufficient funds notification message to a player when the Hand Strength Meter is on. In various embodiments, the user interface 1400 is communicated to a front-end client application from the Hand Strength Meter module 202 for displaying to a user. If the Hand Strength Meter is activated and player can no longer afford funding at the onset of a new hand, the Hand Strength Meter may display the "Off State" warning at the beginning of the hand and deactivate the hand Strength Meter. If the off-table actions (e.g., purchase of gifts with chips or buy-in to a table at a second server) cause the user's chips-to-stack difference fall below the maximum rake, the Hand Strength Meter may allow the user to finish the current hand with the Hand Strength meter enabled, display a warning tooltip, and deactivate the Hand Strength Meter on the next hand.

Figure 15:
FIG. 15 is a screenshot depicting an example embodiment of a user interfaces for presenting a notification of a rake being performed.

FIG. 15 is a screenshot of an example embodiment of a user interface 1500 of presenting a notification of a rake being performed. In various embodiments, the user interface 1500 is communicated to a front-end client application from the Hand Strength Meter module 202 for displaying to a user. In various embodiments, a small notification window may be activated to inform a user that a rake has been taken. This animation depicted in FIG. 15 may be modified to include chips won as well as those charged by the Hand Strength Meter. For example, the notification may state "+$500,000 CHIPS WON!" and "−$5,000 HSM FEE".

Figure 16:
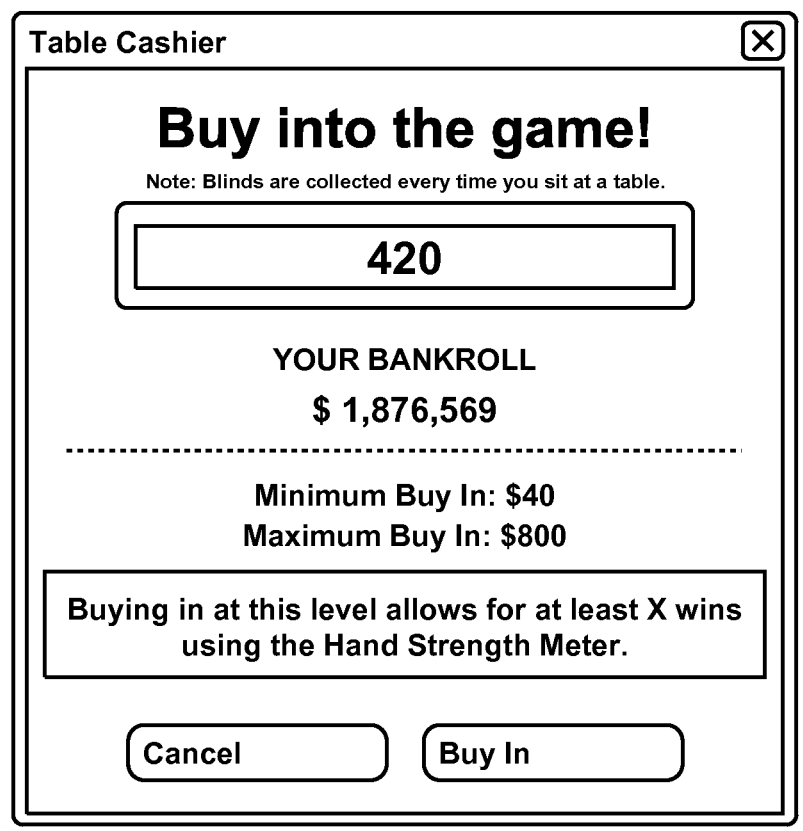
FIG. 16 is a screenshot depicting an example embodiment of a user interfaces for presenting a notification to a player of an option to buy into a game at a particular level and receive at least a certain number of games using the Hand Strength Meter feature.

FIG. 16 is a screenshot of an example embodiment of a user interface 1600 for presenting a notification to a player of an option to buy into a game at a particular level and receive at least a certain number of games using the Hand Strength Meter feature. In various embodiments, the user interface 1600 is communicated to a front-end client application from the Hand Strength Meter module 202 for displaying to a user. In various embodiments, when buying into a table, a notification of the number of the remaining chips available for HSM fees may be presented. The "X" depicted in FIG. 16 may be calculated as (Total Chips−Buy In Chips)/Max Rake. In various embodiments, the maximum rake may be one big blind.

Data Flow

Figure 17:
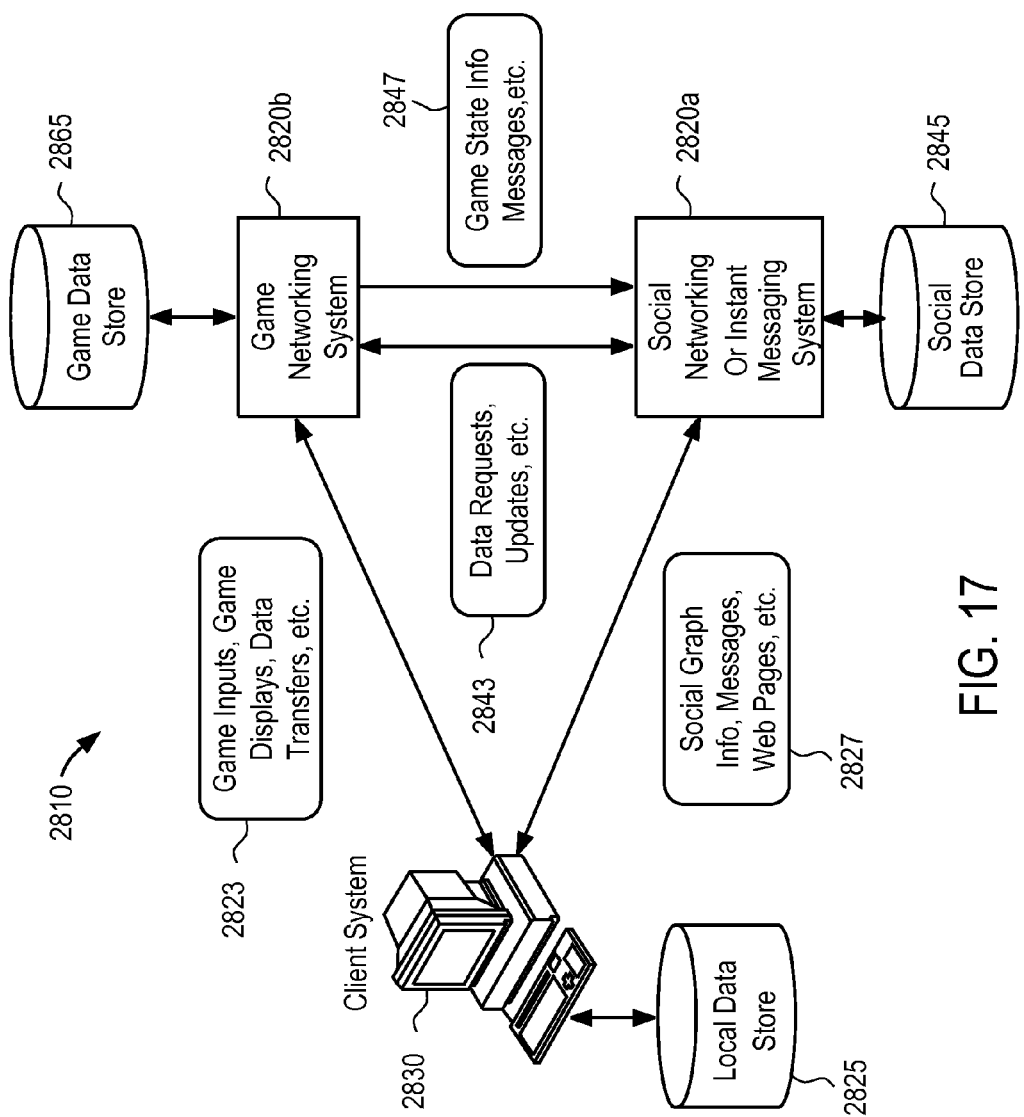
FIG. 17 is a block diagram illustrating an example data flow between the components of a system in which various example embodiments may operate.

FIG. 17 is a block diagram illustrating an example data flow between the components of system 2810. In particular embodiments, system 2810 can include client system 2830, social networking system 2820a, and game networking system 2820b. The components of system 2810 can be connected to each other in any suitable configuration, using any suitable type of connection. The components may be connected directly or over any suitable network. Client system 2830, social networking system 2820a, and game networking system 2820b can each have one or more corresponding data stores such as local data store 2825, social data store 2845, and game data store 2865, respectively. Social networking system 2820a and game networking system 2820b can also have one or more servers that can communicate with client system 2830 over an appropriate network. Social networking system 2820a and game networking system 2820b can have, for example, one or more internet servers for communicating with client system 2830 via the Internet. Similarly, social networking system 2820a and game networking system 2820b can have one or more mobile servers for communicating with client system 2830 via a mobile network (e.g., GSM, PCS, Wi-Fi, WPAN, etc.). In some embodiments, one server may be able to communicate with client system 2830 over both the Internet and a mobile network. In other embodiments, separate servers can be used.

Client system 2830 can receive and transmit data 2823 to and from game networking system 2820*b*. This data can include, for example, webpages, messages, game inputs, game displays, HTTP packets, data requests, transaction information, updates, and other suitable data. At some other time, or at the same time, game networking system 2820*b* can communicate data 2843, 2847 (e.g., game state information, game system account information, page info, messages, data requests, updates, etc.) with other networking systems, such as social networking system 2820*a* (e.g., Facebook, Myspace, etc.). Client system 2830 can also receive and transmit data 527 to and from social networking system 2820*a*. This data can include, for example, webpages, messages, social graph information, social network displays, HTTP packets, data requests, transaction information, updates, and other suitable data.

Communication between client system 2830, social networking system 2820*a*, and game networking system 2820*b* can occur over any appropriate electronic communication medium or network using any suitable communications protocols. For example, client system 2830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HTML documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 2820*b*, the BLOB containing the game state for the instance corresponding to the player can be transmitted to client system 2830 for use by a client-side executed object to process. In particular embodiments, the client-side executable may be a Flash-based game, which can de-serialize the game state data in the BLOB. As a player plays the game, the game logic implemented at client system 2830 maintains and modifies the various game state parameters locally. The client-side game logic may also batch game events, such as mouse clicks, and transmit these events to game networking system 2820*b*. Game networking system 2820*b* may itself operate by retrieving a copy of the BLOB from a database or an intermediate memory cache (memcache) layer. Game networking system 2820*b* can also de-serialize the BLOB to resolve the game state parameters and execute its own game logic based on the events in the batch file of events transmitted by the client to synchronize the game state on the server side. Game networking system 2820*b* may then re-serialize the game state, now modified, into a BLOB and pass this to a memory cache layer for lazy updates to a persistent database.

With a client-server environment in which the online games may run, one server system, such as game networking system 2820*b*, may support multiple client systems 2830. At any given time, there may be multiple players at multiple client systems 2830 all playing the same online game. In practice, the number of players playing the same game at the same time may be very large. As the game progresses with each player, multiple players may provide different inputs to the online game at their respective client systems 2830, and multiple client systems 2830 may transmit multiple player inputs and/or game events to game networking system 2820*b* for further processing. In addition, multiple client systems 2830 may transmit other types of application data to game networking system 2820*b*.

In particular embodiments, a computed-implemented game may be a text-based or turn-based game implemented as a series of web pages that are generated after a player selects one or more actions to perform. The web pages may be displayed in a browser client executed on client system 2830. As an example and not by way of limitation, a client application downloaded to client system 2830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 2820*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 2830, either caused by an action of a game player or by the game logic itself, client system 2830 may need to inform game networking system 2820*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 2810 is discussed in reference to updating a multi-player online game hosted on a network-addressable system (such as, for example, social networking system 2820a or game networking system 2820b), where an instance of the online game is executed remotely on a client system 2830, which then transmits application event data to the hosting system such that the remote game server synchronizes the game state associated with the instance executed by the client system 2830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 2830 may include a Flash client. The Flash client may be configured to receive and run Flash applications or game object codes from any suitable networking system (such as, for example, social networking system 520a or game networking system 2820b). In particular embodiments, the Flash client may be run in a browser client executed on client system 2830. A player can interact with Flash objects using client system 2830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 2830, the Flash client may send the events that caused the game state changes to the in-game object to game networking system 2820b. However, to expedite the processing and hence the speed of the overall gaming experience, the Flash client may collect a batch of some number of events or updates into a batch file. The number of events or updates may be determined by the Flash client dynamically or determined by game networking system 2820b based on server loads or other factors. For example, client system 2830 may send a batch file to game networking system 2820b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 2830. In particular embodiments, the batch file may be a text file and the name-value pairs may be in string format.

In particular embodiments, when a player plays an online game on client system 2830, game networking system 2820b may serialize all the game-related data, including, for example and without limitation, game states, game events, and user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 2820b may retrieve the corresponding BLOB from the database to determine the most-recent values of the game-related data. In particular embodiments, while a player is playing the online game, game networking system 2820b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 18:
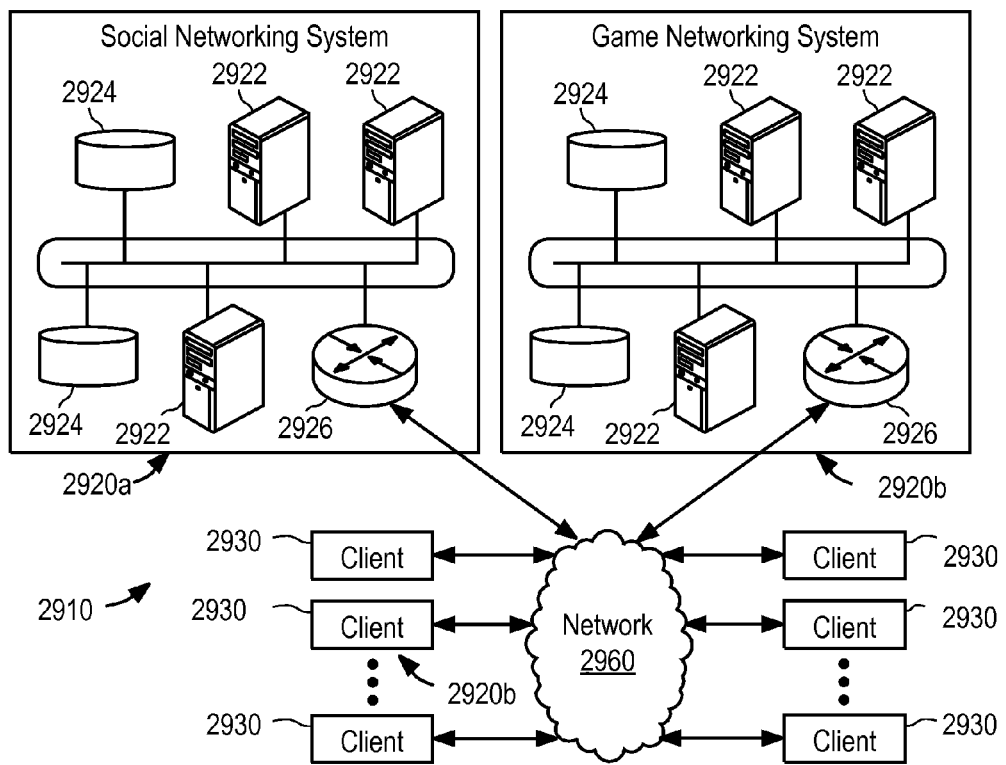
FIG. 18 is a block diagram illustrating an example network environment, in which various example embodiments may operate.

Particular embodiments may operate in a wide area network environment, such as the Internet, including multiple network addressable systems. FIG. 18 is a block diagram illustrating an example network environment 2910, in which various example embodiments may operate. Network cloud 2960 generally represents one or more interconnected networks, over which the systems and hosts described herein can communicate. Network cloud 2960 may include packet-based WANs (such as the Internet), private networks, wireless networks, satellite networks, cellular networks, paging networks, and the like. As FIG. 18 illustrates, particular embodiments may operate in a network environment comprising one or more networking systems, such as social networking system 2920a, game networking system 2920b, and one or more client systems 2930. The components of social networking system 2920a and game networking system 2920b operate analogously; as such, hereinafter they may be referred to simply as networking system 2920. Client systems 2930 are operably connected to the network environment via a network service provider, a wireless carrier, or any other suitable means.

Networking system 2920 is a network addressable system that, in various example embodiments, comprises one or more physical servers 2922 and data stores 2924. The one or more physical servers 2922 are operably connected to computer network 2960 via, by way of example, a set of routers and/or networking switches 2926. In an example embodiment, the functionality hosted by the one or more physical servers 2922 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 2922 may host functionality directed to the operations of networking system 2920. Hereinafter servers 2922 may be referred to as server 2922, although server 2922 may include numerous servers hosting, for example, networking system 2920, as well as other content distribution servers, data stores, and databases. Data store 2924 may store content and data relating to, and enabling, operation of networking system 2920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 2924 corresponds to one or more of a variety of separate and integrated databases, such as relational databases and object-oriented databases, that maintain information as an integrated collection of logically related records or files stored on one or more physical systems. Structurally, data store 2924 may generally include one or more of a large class of data storage and management systems. In particular embodiments, data store 2924 may be implemented by any suitable physical system(s) including components, such as one or more database servers, mass storage media, media library systems, storage area networks, data storage clouds, and the like. In one example embodiment, data store 2924 includes one or more servers, databases (e.g., MySQL), and/or data warehouses. Data store 2924 may include data associated with different networking system 2920 users and/or client systems 2930.

Client system 2930 is generally a computer or computing device including functionality for communicating (e.g., remotely) over a computer network. Client system 2930 may be a desktop computer, laptop computer, personal digital assistant (PDA), in- or out-of-car navigation system, smart phone or other cellular or mobile phone, or mobile gaming device, among other suitable computing devices. Client system 2930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 2930 to enter addresses of specific network resources to be retrieved, such as resources hosted by networking system 2920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 2930 desires to view a particular webpage (hereinafter also referred to as a target structured document) hosted by networking system 2920, the user's web browser, or other document rendering engine or suitable client application, formulates and transmits a request to networking system 2920. The request generally includes a URL or other document identifier as well as metadata or other information. By way of example, the request may include information identifying the user, such as a user identifier (ID), as well as information identifying or characterizing the web browser or operating system running on the user's client computing device 2930. The request may also include location information identifying a geographic location of the user's client system or a logical network location of the user's client system. The request may also include a timestamp identifying when the request was transmitted.

Although the example network environment 2910 described above and illustrated in FIG. 18 described with respect to social networking system 2920a and game networking system 2920b, this disclosure encompasses any suitable network environment using any suitable systems. As an example and not by way of limitation, the network environment may include online media systems, online reviewing systems, online search engines, online advertising systems, or any combination of two or more such systems.

Figure 19:
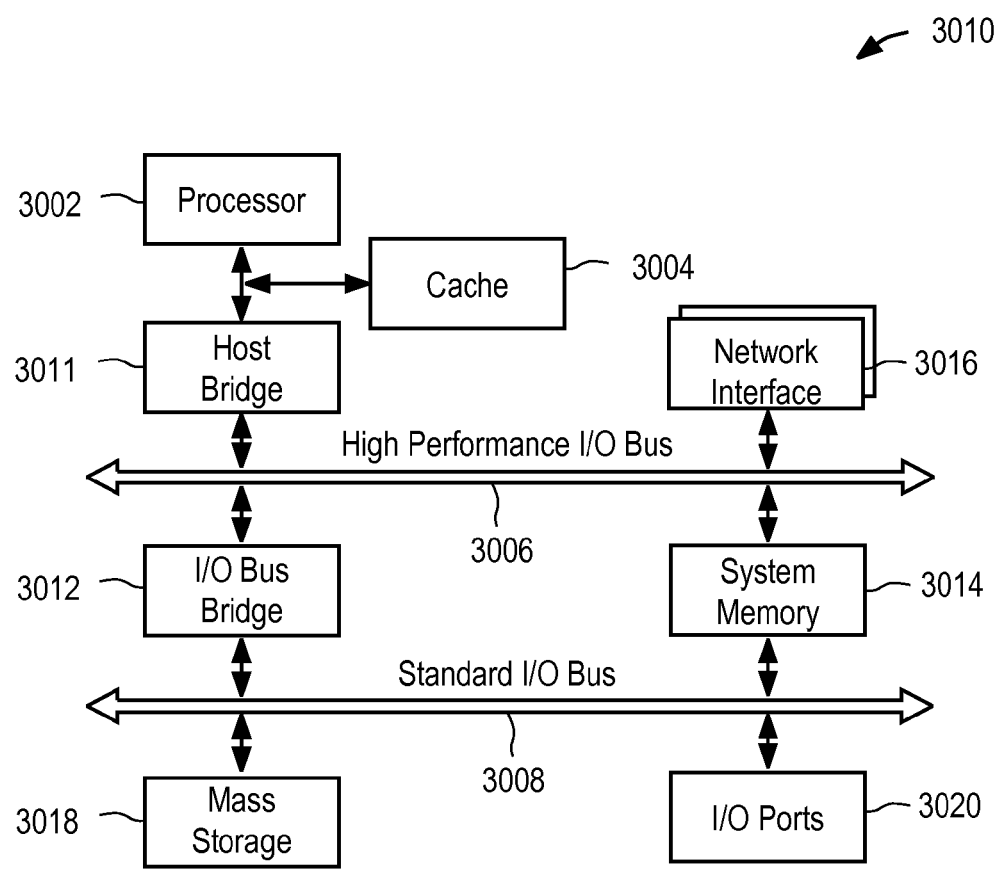
FIG. 19 is a block diagram illustrating an example computing system architecture, which may be used to implement a server system or a client system.

FIG. 19 is a block diagram illustrating an example computing system architecture, which may be used to implement a server 2922 or a client system 2930.

In one embodiment, hardware system 3010 comprises a processor 3002, a cache memory 3004, and one or more executable modules and drivers, stored on a tangible computer readable medium, directed to the functions described herein. Additionally, hardware system 3010 may include a high performance input/output (I/O) bus 3006 and a standard I/O bus 3008. A host bridge 3011 may couple processor 3002 to high performance I/O bus 706, whereas I/O bus bridge 3012 couples the two buses 3006 and 3008 to each other. A system memory 3014 and one or more network/communication interfaces 3016 may couple to bus 3006. Hardware system 3010 may further include video memory (not shown) and a display device coupled to the video memory. Mass storage 3018 and I/O ports 3020 may couple to bus 3008. Hardware system 3010 may optionally include a keyboard, a pointing device, and a display device (not shown) coupled to bus 3008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 3010 are described in greater detail below. In particular, network interface 3016 provides communication between hardware system 3010 and any of a wide range of networks, such as an Ethernet (e.g., IEEE 802.3) network, a backplane, and so forth. Mass storage 3018 provides permanent storage for the data and programming instructions to perform the above-described functions implemented in servers 2922, whereas system memory 3014 (e.g., DRAM) provides temporary storage for the data and programming instructions when executed by processor 3002. I/O ports 3020 are one or more serial and/or parallel communication ports that provide communication between additional peripheral devices, which may be coupled to hardware system 3010.

Hardware system 3010 may include a variety of system architectures and various components of hardware system 3010 may be rearranged. For example, cache 3004 may be on-chip with processor 3002. Alternatively, cache 3004 and processor 3002 may be packed together as a "processor module," with processor 3002 being referred to as the "processor core." Furthermore, certain embodiments of the present disclosure may not require nor include all of the above components. For example, the peripheral devices shown coupled to standard I/O bus 3008 may couple to high performance I/O bus 3006. In addition, in some embodiments, only a single bus may exist, with the components of hardware system 3010 being coupled to the single bus. Furthermore, hardware system 3010 may include additional components, such as additional processors, storage devices, or memories.

An operating system manages and controls the operation of hardware system 3010, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with respect to a poker game, the embodiments can be applied to any game that includes multiple players. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
receiving a notification that a player of a card game has accepted an offer to enable an optional feature of the game in exchange for having a rake performed on winnings of the player, the optional feature including a hand strength meter;
enabling the optional feature of the game;
performing the rake on the winnings;
removing the rake from a virtual economy associated with the game, the removing of the rake being performed by a computer processor; and
providing a remaining winnings to the player.

2. The method of claim 1, further comprising determining a strength of a hand of the card game and wherein the hand strength meter presents a graphic representation of the strength of the hand.

3. The method of claim 2, wherein the determining of the strength of the hand of the card game is based on odds relative to a size of a pot that the hand will become stronger by a completion of a round of the game.

4. The method of claim 1, further comprising providing the offer to enable the optional feature of the game based on the game not being played as a tournament.

5. The method of claim 1, wherein the enabling of the feature of the game is performed at a beginning of a round of the game and is based the player having more virtual currency available than a maximum amount of the rake.

6. The method of claim 1, further comprising highlighting the offer to enable the optional feature of the game based on a level of participation of the player with respect to the game.

7. A non-transitory machine readable storage medium storing a set of instructions that, when executed by at least one processor, causes the at least one processor to perform operations, the operations comprising:
receiving a notification that a player of a card game has accepted an offer to enable an optional feature of the game in exchange for having a rake performed on winnings of the player, the optional feature including a hand strength meter;
enabling the optional feature of the game;
deducting the rake from the winnings;
removing the rake from a virtual economy associated with the game; and
providing a remaining winnings to the player.

8. The non-transitory machine readable storage medium of claim 7, further comprising determining a strength of a hand of the card game and wherein the hand strength meter presents a graphic representation of the strength of the hand.

9. The non-transitory machine readable storage medium of claim 8, wherein the determining of the strength of the hand of the card game is based on odds relative to a size of a pot that the hand will become stronger by a completion of a round of the game.

10. The non-transitory machine readable storage medium of claim 7, the operations further comprising providing the offer to enable the optional feature of the game based on the game not being played as a tournament.

11. The non-transitory machine readable storage medium of claim 7, wherein the enabling of the feature of the game is performed at a beginning of a round of the game and is based the player having more virtual currency available than a maximum amount of the rake.

12. The non-transitory machine readable storage medium of claim 7, the operations further comprising highlighting the offer to enable the optional feature of the game based on a level of participation of the player with respect to the game.

13. A system comprising:
a module implemented by at least one processor and configured to:
receive a notification that a player of a game has accepted an offer to enable an optional feature of the game in exchange for having a rake performed on winnings of the player, the optional feature including a hand strength meter;
enable the optional feature of the game;
deduct the rake from the winnings;
remove the rake from a virtual economy associated with the game; and
provide a remaining winnings to the player.

14. The system of claim 13, further comprising determining a strength of a hand of the card game and wherein the hand strength meter presents a graphic representation of the strength of the hand.

15. The system of claim 14, wherein the determining of the strength of the hand of the card game is based on odds relative to a size of a pot that the hand will become stronger by a completion of a round of the game.

16. The system of claim 13, wherein the module is further configured to provide the offer to enable the optional feature of the game based on the game not being played as a tournament.

17. The system of claim 13, wherein the enabling of the feature of the game is performed at a beginning of a round of the game and is based the player having more virtual currency available than a maximum amount of the rake.

* * * * *

UNITED STATES PATENT AND TRADEMARK OFFICE
CERTIFICATE OF CORRECTION

| | | |
|---|---|---|
| PATENT NO. | : 8,821,263 B1 | Page 1 of 1 |
| APPLICATION NO. | : 13/725277 | |
| DATED | : September 2, 2014 | |
| INVENTOR(S) | : LeBreton, IV et al. | |

It is certified that error appears in the above-identified patent and that said Letters Patent is hereby corrected as shown below:

Specification

In column 7, line 17, delete "network" and insert --networking--, therefor

In column 10, line 6, delete "X:x1" and insert --X:1--, therefor

In column 10, line 42, delete "204" and insert --206--, therefor

In column 10, line 51, before "extraction", insert --asset--, therefor

In column 11, line 14, delete "meter" and insert --Meter module--, therefor

In column 11, line 30, after "Strength", insert --Meter--, therefor

In column 11, line 35, after "Strength", insert --Meter--, therefor

In column 11, line 39, after "Strength", insert --Meter--, therefor

In column 11, line 42, after "Strength", insert --Meter--, therefor

In column 13, line 9, delete "100" and insert --1100--, therefor

Claims

In column 22, line 57, in Claim 5, after "based", insert --on--, therefor

In column 23, line 24, in Claim 11, after "based", insert --on--, therefor

In column 24, line 28, in Claim 17, after "based", insert --on--, therefor

Signed and Sealed this
Twenty-fourth Day of November, 2015

Michelle K. Lee
*Director of the United States Patent and Trademark Office*